Dec. 26, 1939.  C. C. FARMER  2,184,550
RETARDATION CONTROLLER
Filed Aug. 26, 1938   3 Sheets-Sheet 1
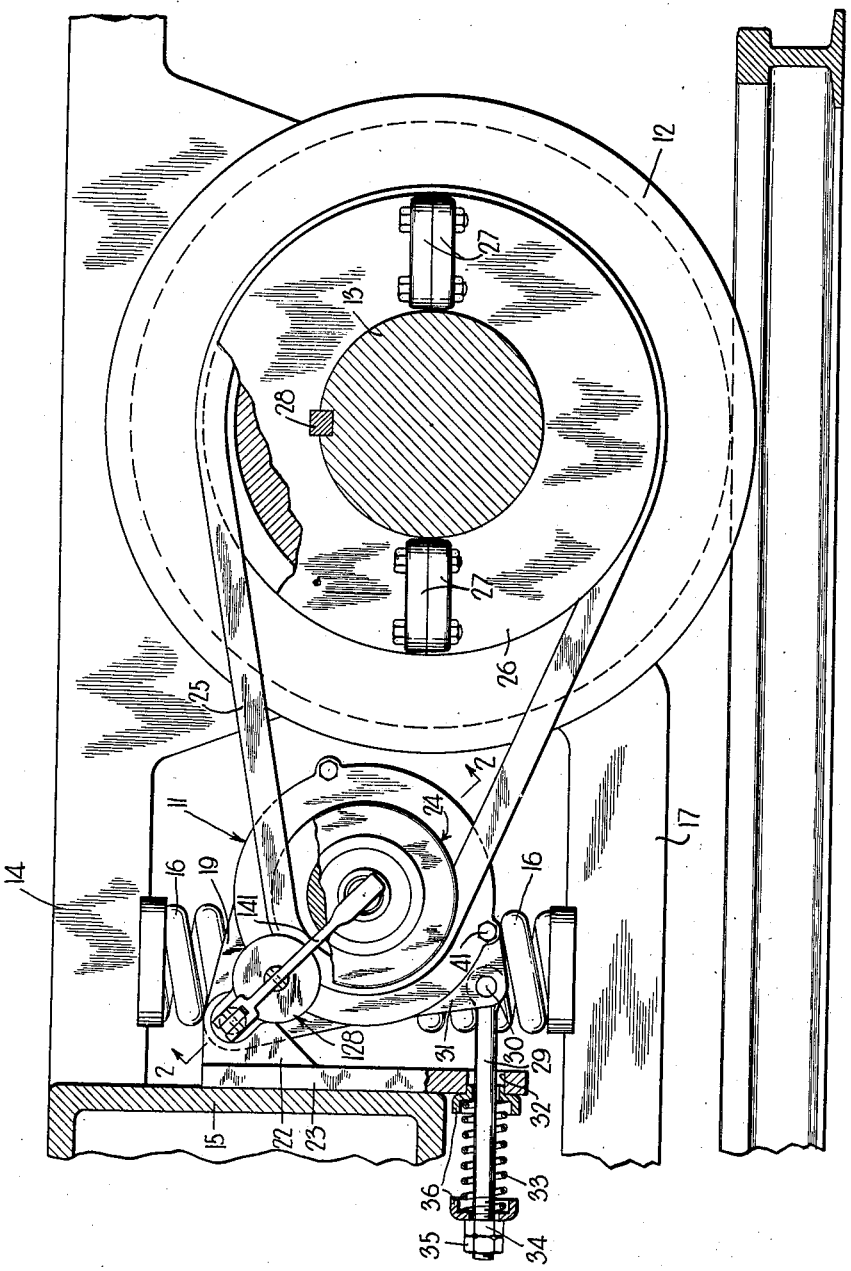
INVENTOR
CLYDE C. FARMER
BY
His ATTORNEY

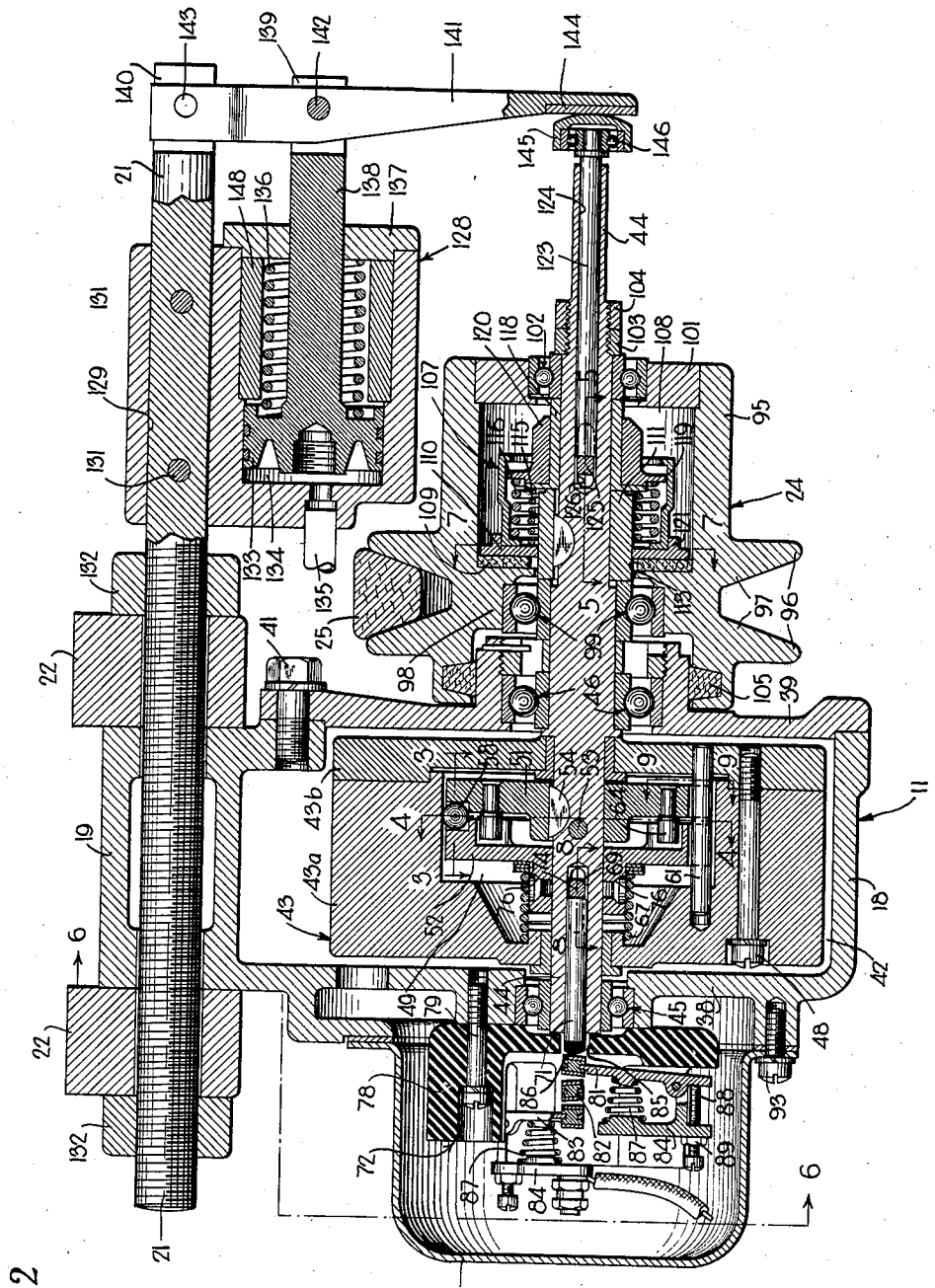

Dec. 26, 1939.        C. C. FARMER              2,184,550
              RETARDATION CONTROLLER
              Filed Aug. 26, 1938          3 Sheets-Sheet 3
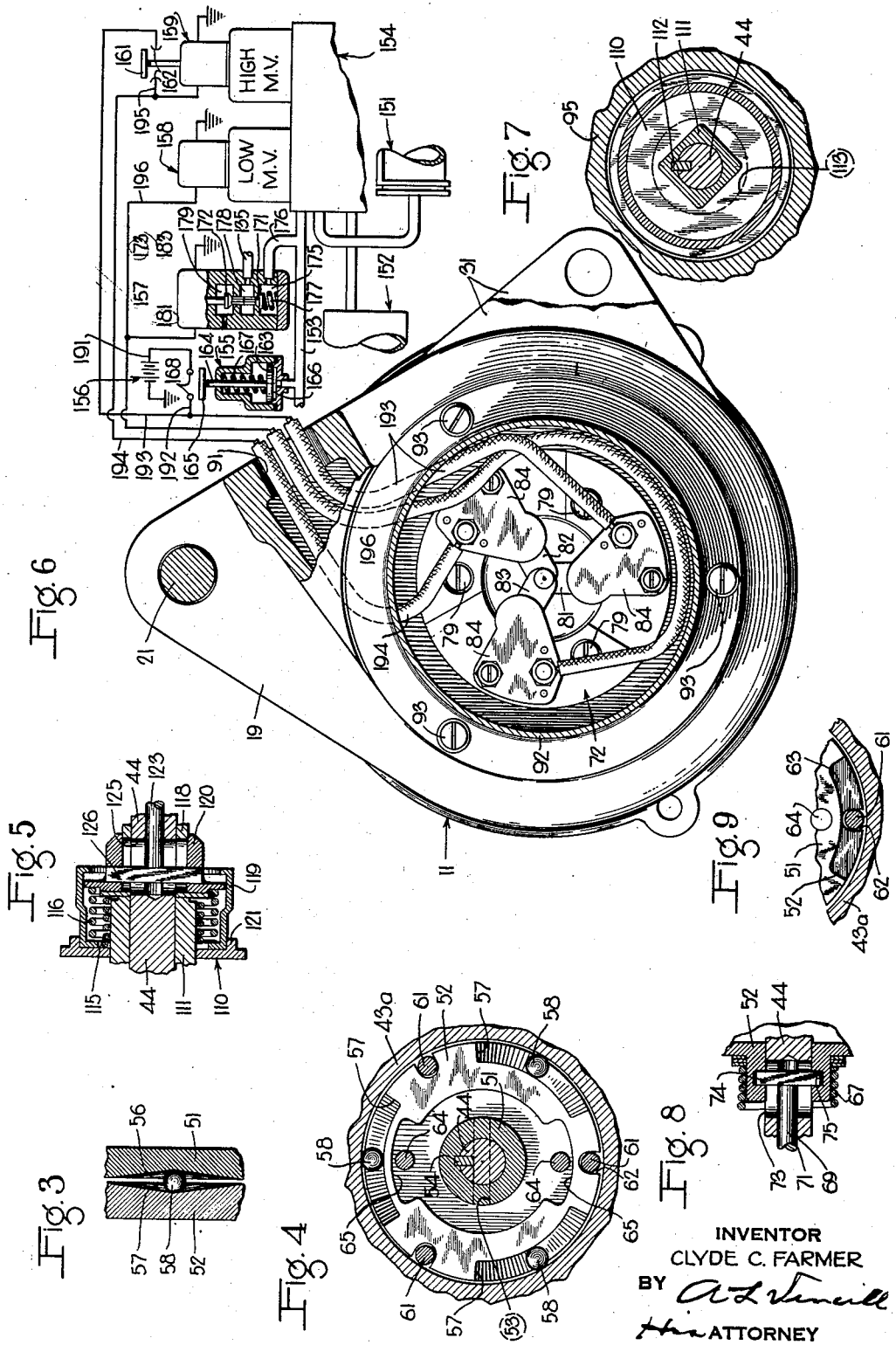
INVENTOR
CLYDE C. FARMER
BY
ATTORNEY Patented Dec. 26, 1939

2,184,550

UNITED STATES PATENT OFFICE 2,184,550

RETARDATION CONTROLLER

Clyde C. Farmer, Pittsburgh, Pa., assignor to The Westinghouse Air Brake Company, Wilmerding, Pa., a corporation of Pennsylvania Application August 26, 1938, Serial No. 226,887

16 Claims. (Cl. 303—21)

This invention relates to retardation controllers adapted to control the retardation of a vehicle such as a railway car or train, and has particular relation to controllers of the rotary inertia type associated with an individual wheel-and-axle unit, or group of wheel-and-axle units, and effective automatically upon the slipping of a wheel of a particular unit, or of the group, to release the brakes on the wheels with which it is associated to prevent sliding of the slipping wheels, and thereafter effective to cause reapplication of the brakes on the wheels with which it is associated.

As is well known, when the degree of application of the brakes on a vehicle wheel is such as to exceed the limit of adhesion between the tread of the wheel and the road or rail surface, the wheel begins to decelerate at an excessively rapid rate toward a locked or non-rotative state and, unless the degree of application of the brakes on the wheel is instantly and rapidly reduced at the instant that the wheel begins to decelerate rapidly, the wheel will in a brief time, of the order of a few seconds, lock and cease to rotate. With the vehicle continuing in motion, the wheel will therefore be dragged along the road or rail surface without rotating, this being referred to herein as a "sliding" of the wheel.

If the degree of application of the brakes is reduced rapidly and sufficiently at the instant that a wheel begins to decelerate, the wheel will cease to decelerate and begin to accelerate back towards a speed corresponding to vehicle or rail speed without actually reaching a locked or non-rotative state. The rotation of a vehicle wheel at a speed less than a speed corresponding to vehicle or rail speed, whether decelerating or accelerating, is referred herein as a "slipping" or "slip" condition.

If the brakes are reapplied on a slipping wheel to a sufficient degree while accelerating back toward a speed corresponding to vehicle or rail speed, the wheel may again begin to decelerate and, if the brakes are not released sufficiently rapidly, may thereafter momentarily attain the locked or non-rotative state and slide. It is desirable, therefore, not to reapply the brakes on a slipping wheel until it has returned fully to a speed corresponding to vehicle or rail speed in order to prevent repeated slipping cycles, if not actual sliding of the wheels.

Since the slipping of a vehicle wheel is caused by a degree of application of the brakes exceeding the limit of adhesion of the wheel to the rail or road surface, it is desirable also to effect reapplication of the brakes to a degree lower than that which initiated the slipping, to further minimize the possibility of recurrent slipping cycles.

In my copending application, Serial No. 137,956, filed April 20, 1937, now Patent 2,140,620, I have disclosed and claimed a brake control equipment, including a retardation controller of the rotary inertia type, adapted to function to effect the above desirable objectives. Several embodiments of rotary inertia devices are disclosed in my copending application, one of which comprises a shaft having a fly-wheel rotatably mounted thereon and a driving pulley for the shaft releasably connected to the shaft through a clutch device. The pulley is connected by an endless belt to an element, such as the axle of a vehicle wheel, which rotates according to the rotation of the vehicle wheel. The fly-wheel is driven by the shaft through a resilient yielding connection which enables the fly-wheel to shift rotatively relative to the shaft in a leading or a lagging direction when the shaft is decelerated or accelerated at a rate exceeding a certain rate, and an arrangement is provided whereby operation of the contact members of a switch device is effected in response to the rotative shifting of the fly-wheel with respect to the shaft.

The clutch device conecting the pulley to the shaft comprises a biasing spring so tensioned that when a vehicle wheel decelerates in excess of a certain rate obtaining as when a vehicle wheel slips, the driving connection between the pulley and the shaft slips and thus the shaft continues to rotate according to the speed of rotation of the fly-wheel or inertia element after the fly-wheel shifts rotatively in a leading direction with respect to the shaft a limited extent. The contact members of the switch device are accordingly operated to a closed position and remain in a closed position until the vehicle wheel and consequently the pulley again accelerates up to the speed of the shaft and fly-wheel, which continue to rotate at a speed corresponding to the speed of the vehicle, at which time the clutch device reconnects the pulley in driving relation to the shaft.

As a practical matter, I have found it difficult to suitably adjust the tension of the single spring of the clutch device so that it will maintain a driving connection between the pulley and the shaft of the inertia device without slipping as long as the vehicle wheels do not slip and at the same time not exert an excessive drag on the shaft during the wheel-slipping period. If the drag of the pulley on the shaft of the inertia device, through the clutch device, is excessive during the wheel-slipping period, the shaft and fly-wheel decelerate at a more rapid rate than the rate of reduction in speed of the vehicle. Accordingly, in such case, the pulley and shaft are restored to their normal driving relation before the slipping vehicle wheel is actually fully restored to a speed corresponding to vehicle or rail speed.

My present invention contemplates an improved clutch arrangement between the pulley and the shaft of the inertia device employing two separate coil springs, both of which are normally effective to effect engagement of the clutch parts to connect the pulley to the shaft in driving relation, and in further providing mechanism for relieving the tension on one of the springs of the clutch device upon the occurrence of slipping of a vehicle wheel to prevent the excessive drag of the pulley on the shaft and fly-wheel. Thus the shaft and fly-wheel are enabled to rotate at a speed at least as great as the reducing vehicle speed so that the reengagement of the pulley to the shaft through the clutch device is not effected before the slipping wheel or wheels return fully to a speed corresponding to vehicle or rail speed.

It is accordingly an object of my invention to provide a rotary inertia device generally similar in construction to the rotary inertia device disclosed and claimed in my Patent 2,140,620, but of improved construction.

More specifically it is an object of my invention to provide a rotary inertia device of the character disclosed in my Patent 2,140,620, and including a clutch device of novel construction associating a driving pulley and the shaft of the inertia device which obviates the need for delicate and critical adjustment of the clutch device.

The above objects, and other objects of my invention which will be made apparent hereinafter, are obtained by means of an illustrative embodiment of my present invention subsequently to be described and shown in the accompanying drawings, wherein, Fig. 1 is a fragmental view, showing the disposition and arrangement of the rotary inertia device constituting my present invention, on a car truck.

Fig. 2 is a sectional view taken on the line 2—2 of Fig. 1 showing in detail the construction of my improved rotary inertia device.

Figs. 3, 4 and 5 are fragmental sectional views, taken on the lines 3—3, 4—4 and 5—5, respectively, of Fig. 2, Fig. 6 is a view representing, in part, a sectional view taken on the line 6—6 of Fig. 2 and, in part, a diagrammatic simplified arrangement of the brake control equipment disclosed in detail and described fully in my Patent 2,140,620, and Figs. 7, 8 and 9 are fragmental sectional views, taken on the lines 7—7, 8—8 and 9—9, respectively, of Fig. 2.

*Description of equipment*

Referring to Fig. 1, a manner in which a rotary inertia device 11, embodying my invention, may be mounted on a vehicle truck and connected in associated relationship with a car wheel-and-axle unit is shown. For simplicity, only one wheel-and-axle unit of a wheel truck is shown, comprising a pair of wheels 12, only one of which is visible, fixed to and connected by an axle 13. The truck frame has two side frames 14, only one of which is visible in the drawings, which are connected by a transverse strut or transom 15 and supported resiliently on a plurality of coil springs 16, only one of which is visible, which are in turn supported on equalizing bars 17. The equalizing bars 17, only one of which is partially visible, rest at opposite ends thereof on the journal boxes, not visible, associated with the end of the axles 13 of adjacent wheel-and-axle units. The side frames 14 of the truck frame are provided at opposite ends thereof, in conventional manner, with pedestal jaws which slidably dove-tail in vertical grooves provided in the corresponding axle journal box housings.

The rotary inertia device 11 has a cylindrical or tubular casing 18, see Fig. 2, provided with a radially extending portion 19 which is pivoted at the outer end thereof on a threaded rod 21, between spaced lugs 22 formed on a bracket 23 which is suitably attached as by welding to the transom 15 connecting the side frames 14 of the truck.

As will be described in greater detail later on, the rotary inertia device 11 is provided with a driving pulley 24 which may be connected, as by an endless belt or chain 25, to a similar pulley 26 fixed on the axle 13 at a point between the spaced vehicle wheels 12. For convenience, the pulley 26 may be formed in two parts having cooperating flanges 27 adapted to be bolted together in surrounding relation to the axle 13. To prevent slippage of the pulley 26 on the axle 13, a key 28 may be provided.

In order to maintain the endless belt 25 at a proper tension at all times regardless of the vertical movement of the truck frame including the side frames 14, due to road shock or variable loading, a tensioning device is provided which may consist of a rod pivoted at one end on a pin 30 between a pair of spaced lugs 31 formed on or attached to the outer surface of the casing 18 of the rotary inertia device 11, the rod 29 extending through an opening 32 in the bracket 23 and biased in a direction to tension belt 25 by a coil spring 33. As shown in Fig. 1, the tensioning rod 29 is threaded at the outer end to receive a suitable nut 34 and lock nut 35, and the coil spring 33 is interposed in compressed condition between spaced collars 36, one of which engages the bracket 23 and the other of which engages the nut 34.

Referring now more particularly to Fig. 2 of the drawings, the cylindrical casing 18 of the rotary inertia device 11 is provided at one end with an inwardly extending end flange 38 and is open at the opposite end, an end or cover plate 39 being detachably secured to the casing 18, as by a plurality of screws 41, to close the open end of the casing.

Contained in the chamber 42 formed within the casing is a rotary inertia element, in the form of a fly-wheel 43, which is rotatively mounted on a shaft 44 that is in turn supported in ball-bearing units 45 and 46 fixed in suitably formed hub portions provided in the end flange 38 and cover plate 39, respectively.

The fly-wheel 43 is made up of two annular portions 43a and 43b which are so formed as to fit cooperatively and to be bolted together as by a plurality of screws 48, only one of which is visible. The portions 43a and 43b of the fly-wheel 43 are suitably formed so as to provide therewithin a completely enclosed chamber 49 through which the shaft 44 extends.

Contained in the chamber 49 are two discs 51 and 52, the disc 51 being fixed to the shaft 44 as by a pin 53 and key 54 and the disc 52 being shiftable rotatively and slidable in an axial direction on the shaft 44.

As seen in Fig. 2 and also Figs. 3 and 4, the adjacent faces of the two discs 51 and 52 are provided adjacent the periphery thereof with a plurality of recesses 56 and 57, respectively, the recesses corresponding in number and spacing and disposed in registration or complementary relation so as to form pockets between the two discs, in each of which pockets is contained a steel ball 58. As will be seen particularly in Figs. 3 and 4, the recesses 56 and 57 in the discs 51 and 52 are relatively short and curved and vary in depth, being deepest at the mid-point thereof and sloping to the face of the disc 51 or 52 at opposite ends of the recesses.

As seen in Figs. 4 and 9, a plurality of guide pins 61 are fixed in the portions 43a and 43b of the fly-wheel 43 in such a manner as to extend through the chamber 49 within the fly-wheel in radially spaced parallel relation to the shaft 44, the disc 52 having a corresponding number of notches 62 formed in the periphery thereof through which the pins respectively extend. The notches 62 conform closely to the pins 61 and prevent any relative movement between the disc 52 and the fly-wheel 43 but, at the same time, the arrangement is such as to permit the shifting of the disc 52 axially along the shaft 44 with respect to the fly-wheel 43. The disc 51 is provided with suitable arcuate slots 63 in the periphery thereof so disposed that the several pins 61 extend respectively through the mid-point thereof. Accordingly, relative rotative movement of the disc 51 with respect to disc 52 and fly-wheel 43 is permitted.

The degree of rotative movement of the disc 51 relative to disc 52 and fly-wheel 43, is however, limited by a plurality of pins 64, two of which are employed for the purpose of illustration, secured as by a riveting to the disc 51, and extending in a direction parallel to the shaft 44 into cooperating arcuate slots 65 formed in the same face of the disc 52 as the recesses 57 but located radially inwardly with respect thereto.

The discs 51 and 52 have a certain normal position rotatively with respect to each other, as will be hereinafter explained, and in this normal position the pins 64 are located midway of the stop shoulders at the opposite ends of the slot 65. Accordingly, when the disc 51 is shifted rotatively in one direction with respect to the disc 52, each pin 64 engages the stop shoulder at one end of the corresponding slot 65 to limit the degree of relative rotative movement between the discs and when the disc 51 is shifted in the opposite direction with respect to the disc 52, the pins engage the stop shoulders at the opposite ends of the corresponding slots to likewise limit the degree of relative rotative movement between the discs.

If desired, the pins 64 and the slots 65 may be omitted and the slots 63 in the disc 51 made sufficiently short to serve the same purpose of limiting the degree of relative rotative movement between the discs 51 and 52.

The disc 52 is yieldingly urged along the shaft 44 in the direction of the disc 51 by a coil spring 67 which concentrically surrounds the shaft 44 within the chamber 49 and is interposed between one face of the disc and the end wall of the fly-wheel portion 43a.

The spring 67 is of such strength that as long as the shaft 44 is not decelerating rotatively at a rate exceeding a certain rate, the spring maintains the disc 52 in its normal rotative position with respect to the disc 51, that is the position in which the steel balls 58 are seated in the deepest portion of the complementary recesses 56 and 57 in the discs, thus effectively interlocking the discs 51 and 52 so that they rotate together.

When the shaft 44 decelerates rotatively at a rate in excess of a certain rate, the torque force exerted on the disc 52 due to the inertia or kinetic energy in the fly-wheel 43 is sufficient to overcome the spring 67 and the disc 52 will, therefore, be shifted slidably along the shaft 44 in the left-hand direction as seen in Fig. 2 due to the interaction of the steel balls 58 and the sloping sides of the recesses 56 and 57 in the discs 51 and 52.

The shaft 44 is provided with an axial bore 69 containing a plunger 71 which is shifted slidably therein, upon the axial shifting of the disc 52 along the shaft 44, to effect the operation of a switch device 72. The shaft 44 is provided with a transverse slot 73 extending therethrough and intersecting the bore 69; and a square pin 74 extends through the slot 73 and is adapted to engage the inner end of the plunger 71, the pin 74 projecting at opposite ends beyond the shaft 44 into an annular groove 75 formed in the hub portion of the disc 52. The hub portion of the disc 52 is provided with diametrically opposite holes 76 which open into the annular groove 75 to enable the pin 74 to be inserted. After assembly of disc 52 on the shaft 44 and insertion of pin 74, the disc 52 is turned so that the pin 74 is at right angles to the holes 76 and thus remains confined within the groove 75 at all times, since under operating conditions the relative movement between the disc 52 and the shaft 54 at no time attains such an angle of displacement.

It will thus be seen that the pin 74 does not interfere with the rotative movement of the disc 52 relative to the shaft 44 but is nevertheless shifted axially according to the axial movement of the disc 52 to correspondingly shift the switch operating plunger 71.

As seen in Figs. 2 and 6, the switch device 72 comprises a base portion 78 of insulating material, secured as by a plurality of screws 79 to the outer face of the end flange 38 of the casing 18 of the rotary inertia device 11, and a plurality of contact fingers, illustrated as three contact fingers 81, 82 and 83, respectively pivoted on corresponding metallic brackets 84 suitably attached to the insulating base portion 78. The three contact fingers 81, 82 and 83 are disposed in angularly spaced relation and the tip ends thereof arranged in axially spaced relation in a row in alignment with the end of the plunger 71 which extends through a suitable opening 85 in the insulating base 78 and engages the contact finger 81. To prevent grounding of the contact finger 81 by engagement of the plunger 71 therewith, a tip 86 of insulating material is provided on the plunger 71.

Each of the contact fingers 81, 82 and 83 is yieldingly urged by a coil spring 87, interposed between the finger and the corresponding bracket 84, to a normal position determined by a stop screw 88. Each stop screw is provided with a lock nut 89 for locking the screw in any desired adjusted position so that normally the contact ends of the three contact fingers 81, 82 and 83 are out of engagement with each other.

The arrangement of the contact fingers 81, 82 and 83 of the switch device 72 and the plunger 71 is such that when the plunger 71 is shifted in the left-hand direction from the position shown, the contact tip of finger 81 first engages the contact tip of finger 82 and then the contact tip of finger 82 engages the contact tip of finger 83.

As seen in Fig. 6, the outer face of the flange 38 of the casing 18 is formed with an outlet passage 91 through which electrical circuit wires may enter the casing, connections thereof to the respective contact fingers 81, 82 and 83 being effected as by attachment to the respective brackets 84 on which the contact fingers are pivoted. A cup-shaped cover 92 is provided which is removably attachable to the casing 18 as by a plurality of screws 93 for enclosing the switch device 72.

The pulley 24 of the rotary inertia device 11 is associated with the end of the shaft 44 which projects through the cover plate 39 of the casing 18. The pulley 24 is formed with a cylindrical or tubular portion 95 (see Fig. 2) having on the outer periphery thereof two spaced annular ribs 96 which form therebetween a V-shaped groove 97 for receiving the V-shaped endless belt 25. The pulley 24 is provided with an inwardly extending flange 98 substantially in radial alignment with the belt groove 97 and a ball-bearing unit 99 is suitably interposed between the flange and the shaft 44 for rotatably supporting the pulley on the shaft.

The outer open end of the cylindrical portion 95 of the pulley is adapted to have secured thereto an end disc 101 provided with a central opening through which the shaft 44 extends and having a ball-bearing unit 102 interposed in the opening between the disc and the shaft to provide additional support for the pulley on the shaft. A suitable nut 103 and lock nut 104 is provided on the outer threaded end of the shaft 44 to provide suitable adjustment for the bearing units 99 and 102.

The inner end of the cylindrical portion 95 of the pulley 24 concentrically surrounds the outer hub portion of the cover plate 39 of the casing 18 and a packing ring 105, of suitable material such as felt, is inset in the cylindrical portion 95 of the pulley and engageable with the hub portion of the cover plate 39 to exclude dust or other foreign particles from the bearings 46 and 99. Suitable means, not shown, may also be provided for excluding dust and dirt from the bearing unit 102 at the outer end of the shaft 44.

The pulley 24 is connected in driving relation to the shaft 44 by a clutch device 107 contained in a chamber 108 formed within the tubular portion 95 of the pulley between the annular flange 98 and the outer end disc 101.

The clutch device 107 comprises, according to my invention, an annular clutch disc 109, of suitable material such as fiber or leather, concentrically surrounding the shaft 44 and adapted to engage a clutch surface formed on the outer face of the annular flange 98 of the pulley 24, and a clutch member 110 which is arranged, as presently described, so as to be slidable along the shaft 44 but fixed for rotation therewith to press the clutch disc 109 against the flange 98 of the pulley 24. As seen in Figs. 2 and 7, the clutch member 110 has a central opening of square shape conforming to the outer square contour of a sleeve element 111 which is fixed to the shaft 44 as by a key 112. The clutch disc 109 has a circular central opening 113 therein through which the shaft 44 and sleeve 111 extend. The clutch disc 109 may be secured as by screws or rivets to the clutch member 110 or to the annular flange 98 on the pulley 24 or it may be unsecured to either the flange or the clutch member if desired.

The clutch member 110 is yieldingly urged in a direction to press the clutch disc 109 against the flange 98 of the pulley 24 by two concentrically disposed coil springs 115 and 116, spring 115 being within the spring 116 and both springs surrounding the shaft 44 within the chamber 108 of the pulley 24. Spring 115 is interposed immediately surrounding the sleeve 111 between the clutch member 110 and the flange at one end of a sleeve 118, that surrounds the shaft 44 and is rigidly held in position on the shaft between the sleeve 111 and the ball-bearing unit 102 at the outer end of the shaft 44. Spring 115 is thus constantly effective to urge the clutch member 110 in a direction to press the clutch disc 109 to the flange 98 of the pulley.

The spring 116 is interposed between an inwardly extending flange at one end of a cylindrical cage member 119 and the outwardly extending flange of a sleeve member 120 which is shiftable slidably on the sleeve 118 between the flange at one end thereof and the end cover 101 of the pulley 24. The inner end of the cage member 119 is received within and supported by an annular rib 121 on the face of the clutch member 110 and the outer end of the cage member 119 is supported by the flange of the sleeve 120 which fits closely and is slidable within the cage member 119.

The sleeve 120 is urged inwardly to its inner position, determined by the engagement thereof with the flange on the sleeve 118, through the medium of a plunger 123 which is received in a bore 124 in the outer end of the shaft 44 and which engages a pin 125 of square contour that extends transversely across the bore 124 in a transverse slot 126 in the shaft 44 and in the sleeve 118, and engages at opposite ends thereof in square openings in the sleeve 120 as seen in Fig. 5. When the force urging the plunger 123 inwardly is removed, the spring 116 expands and shifts the sleeve 120 slidably along the sleeve 118 until the flange on the sleeve 120 engages an inwardly extending flange at the outer end of the cylindrical cage 119 which limits the degree of expansion of the spring 116.

It will thus be seen that when the plunger 123 is urged inwardly to its maximum degree, both of the coil springs 115 and 116 are effective to cause a clutching engagement between the pulley 24 and the shaft 44, thus requiring a certain torque force to be exerted on the pulley 24 before slipping of the pulley 24 relative to the shaft 44 occurs.

When the force urging the plunger 123 inwardly is removed and the coil spring 116 expanded to the maximum degree permitted, the friction between the flange 98 on the pulley and the clutch member 110 is reduced due to the reduction of the spring pressure applied thereto, and thus the pulley 24 may slip relative to the shaft 44 upon the application of a lower torque force thereto. The purpose of the clutch device 107 will be more fully explained hereinafter in connection with an assumed operation.

The position of the plunger 123 in the bore 124 of the shaft 44 is varied under the control of an operating cylinder 128 which may be mounted and supported in any suitable manner as on an extended portion of the threaded rod 21 on which the rotary inertia device 11 is pivoted. (See Fig. 2.) The casing of the cylinder 128 may accordingly be provided with a lateral extension having a suitable bore 129 through which the rod 21 extends; and a plurality of pins 131, extending transversely through the rod 21 and the laterally extending portion of the cylinder 28, may be provided for preventing rotation of the cylinder 128 on the rod 21. The rod 21 may be held against rotation by means of nuts 132 screwed on the threaded portion of the rod 21 and engaging the outer faces of the lugs 22 on the supporting bracket 23 for the rotary inertia device 11.

The cylinder 128 may contain therewithin a piston 133 having at one side thereof a piston chamber 134, to which fluid under pressure is supplied and released through a pipe 135, and a coil spring 136 located on the opposite side of the piston to the chamber 134 in interposed relation between the piston and the end cover 137 for the cylinder 128. The piston 133 has a stem 138 which extends slidably through an opening in the end cover 137 of the cylinder 128 and which is formed at the outer end thereof as a yoke having two prongs 139 only one of which is visible in the drawings.

The rod 21 and the stem 138 of the piston 133 are in substantially parallel relation and the end of the rod 21 terminates adjacent the outer end of the stem 138. An operating lever 141 is pivoted at a point intermediate its ends, as on a pin 142, between the prongs 139 on the stem 138 of the piston 134 and one end of the lever 141 is formed as a yoke and straddles the flat end portion 140 of the rod 21 and is pivoted thereto as by a pin 143. The opposite end of the lever 141 is provided with a bearing plate 144, of suitable material, which is adapted to contact the rounded face of a contact cap or disc 145 that is rotatably mounted on and secured to the outer end of the plunger 123 in the shaft 44 of the rotary inertia device, as by a ball-bearing unit 146.

When fluid under pressure is released from the piston chamber 134 of the operating cylinder 128, the coil spring 136 shifts the piston 134 in the left-hand direction and thus pivots the lever 141 on the pin 143 in a clockwise direction, as seen in Fig. 2, to urge the plunger 123 inwardly to its maximum degree. When fluid at a pressure in excess of a certain low pressure is supplied to the piston chamber 134, the piston 133 is urged in the right-hand direction against the resistance of the spring 136, thus pivoting the lever 141 in a counterclockwise direction and removing the force applied on the end of the plunger 123 of the rotary inertia device 11. The movement of the piston 133 in response to the pressure of the fluid supplied to the chamber 134 is limited by the engagement of the piston with the inwardly projecting edge of a stop sleeve 148 secured within the cylinder 128 in concentric surrounding relation to the coil spring 136.

The rotary inertia device 11 is adapted to function in connection with a brake control equipment that is described in detail and claimed in my above-mentioned Patent 2,140,620. For the purposes of the present application it is deemed sufficient, therefore, to show and describe only a simplified diagrammatic representation of the essential parts of the brake control equipment disclosed in my copending application.

Referring to Fig. 6, the essential parts of the brake control equipment necessary to an understanding of the operation of my rotary inertia device 11 may comprise one or more brake cylinders 151 for operating the brakes associated with the single wheel-and-axle unit comprising the vehicle wheels 12 and axle 13 or additional wheel-and-axle units, a source of fluid under pressure such as a supply reservoir 152 suitably charged with fluid under pressure, a control pipe 153 normally uncharged and adapted to be charged with fluid at a desired pressure under the control of a self-lapping brake valve, not shown, a control valve mechanism 154 operative in response to the pressure of fluid supplied thereto through the control pipe 153 to supply fluid under pressure from the supply reservoir 152 to the brake cylinder 151, a pressure switch 154 controlled by the pressure in the control pipe 153, and a source of electric current such as a storage battery 156. Also provided, according to my present invention, is a magnet valve device 157 for controlling the supply of fluid under pressure to and the release of fluid under pressure from the piston chamber 134 of the operating cylinder 128 associated with the rotary inertia device 11.

The control valve mechanism 154 is shown and described in detail in my Patent 2,140,620, and is accordingly shown only fragmentally in outline form in the present application. Briefly, however, the control valve mechanism 154 comprises a self-lapping relay valve device and an operating mechanism comprising a pair of axially spaced diaphragms of different areas so arranged in the casing as to form chambers respectively associated with the diaphragms. Whenever fluid under pressure is supplied to the chamber associated with the larger diaphragm, at a given pressure, the relay valve device of the control valve mechanism 154 operates to supply fluid under pressure from the reservoir 152 to the brake cylinder 151 and establishes a pressure therein corresponding substantially to the pressure established in the operating chamber. When fluid at the same given pressure is supplied only to the chamber associated with the smaller diaphragm, the relay valve device is operated to supply fluid under pressure from the reservoir 152 to the brake cylinder 151 and establishes a pressure therein which is a fixed fraction of the pressure which is established by the same pressure acting in the chamber associated with the larger diaphragm. For illustrative purposes, the pressure established in the brake cylinder 151 when fluid at the given pressure is supplied only to the chamber associated with the smaller diaphragm of the control valve mechanism 154 may be three-fourths of that established when fluid at the same pressure is supplied to the chamber associated with the larger diaphragm of the control valve mechanism.

The control valve mechanism 154 includes two magnet valve devices 158 and 159 which control the supply and the release of fluid under pressure from the control pipe 153 to the chambers associated with the smaller and the larger diaphragms, respectively, of the control valve mechanism 154.

When the magnet valve device 158 is deenergized, it establishes communication through which fluid under pressure supplied into the control pipe 153 flows to the chamber associated with the smaller diaphragm of the control valve mechanism 154, and is accordingly hereinafter referred to as the low magnet valve. When the magnet valve device 158 is energized, it interrupts the supply connection from the control pipe 153 to the chamber associated with the smaller diaphragm of the control valve mechanism 154 and vents fluid under pressure from the chamber.

When the magnet valve device 159 is deenergized, it establishes communication through which fluid under pressure may flow from the control pipe 153 to the chamber associated with the larger diaphragm of the control valve mechanism 154 and is accordingly referred to hereinafter as the high magnet valve. When the high magnet valve 159 is energized, it interrupts the supply communication just described and independently vents fluid under pressure from the chamber associated with the larger diaphragm.

It will thus be seen that when both the high magnet valve 159 and the low magnet valve 158 are deenergized, the pressure established in the brake cylinder 151 corresponds substantially to the pressure established in the control pipe 153, since the larger diaphragm controls the operation of the relay valve device of the control valve mechanism 154. When both the high and low magnet valves 159 and 158 are energized, and fluid under pressure thus simultaneously vented from the chambers associated with both the larger and the smaller diaphragms of the control valve mechanism 154, the relay valve device of the control valve mechanism 154 is operated to release fluid under pressure from the brake cylinder 151 while the pressure is maintained in the control pipe 153.

When the high magnet valve 159 is energized and the low magnet valve 158 is deenergized, fluid under pressure is supplied only to the chamber associated with the smaller diaphragm of the control valve mechanism 154, and thus the pressure established in the brake cylinder 151 corresponds to the assumed fraction, that is, three-fourths of the pressure established in the control pipe 153.

The high magnet valve 159 is effective when energized to actuate a switch member 161 from a position out of contact with a pair of associated fixed contact members 162 into contact therewith to establish a self-holding circuit for its own magnet winding, in the manner to be hereinafter described.

The pressure switch 155 is illustrated in simplified diagrammatic form as comprising a casing containing a piston 163 having a stem 164 carrying in insulating relation thereon a switch member 165. At one side of the piston 163 is a chamber 166 which is constantly connected, as shown, to the control pipe 153 and, at the opposite side of the piston, is a coil spring 167 which yieldingly urges the piston downwardly to a position to normally disengage the switch member 165 from a pair of associated contact members 168. The spring 167 is of such strength that when the pressure of the fluid in the control pipe 153 acting in the chamber 166 on the piston 163 exceeds a certain uniform low pressure, such as five pounds per square inch, the resistance of the spring is overcome and the piston is accordingly snapped upwardly to effect the engagement of the switch member 165 with its associated contact members 168. Conversely, when the pressure in the control pipe reduces below the uniform pressure of five pounds per square inch, the spring becomes effective to return the piston downwardly to its normal position and thus disengage the switch member 165 from its associated contact members 168.

The magnet valve device 157 may comprise a suitable casing containing two oppositely seating valves 171 and 172, of the poppet type and hereinafter referred to as the supply valve and the release valve respectively, and an electromagnet winding or solenoid 173 for effecting operation of the valves 171 and 172.

The supply valve 171 is contained in a chamber 175 which is connected to a suitable source of fluid pressure, such as control pipe 153, through a branch pipe 176; and a coil spring 177 interposed between the valve 171 and the casing normally urges the valve 171 into seated relation on an associated valve seat formed on the casing to close communication past the valve from the chamber 175 to a chamber 178 which is constantly connected through the pipe 135 to the piston chamber 134 of the operating cylinder 128 associated with the rotary inertia device 11.

The release valve 172 is contained in a chamber 179 that is constantly open to atmosphere through a port 181. The supply valve 171 and the release valve 172 have fluted stems which meet in contacting relation within the chamber 178 so that when the supply valve 171 is seated, the release valve 172 is unseated to establish communication therepast from the chamber 178 to the atmospheric chamber 179.

When the electromagnet winding 173 is energized, it actuates a plunger 183 downwardly to engage and cause the release valve 172 and the supply valve 171 to be shifted respectively to seated and unseated positions.

It will thus be seen that when the magnet winding 173 of the magnet valve device 157 is deenergized, fluid under pressure is vented past the release valve 172 to atmosphere from the piston chamber 134 of the operating cylinder 128 associated with the rotary inertia device 11. It will also be seen that when the magnet winding 173 is energized, the exhaust communication is closed and the supply communication past the supply valve 171 established through which fluid under pressure is supplied from the control pipe 153 to the piston chamber 134 of the operating cylinder 128.

Suitable electric circuits, hereinafter to be described, are provided whereby the energization and deenergization of the magnet valve device 157 and the magnet valve devices 158 and 159 of the control valve mechanism 154 is effected under the control of the switch device 72 of the rotary inertia device 11 and the pressure switch 155.

Operation of equipment

Referring to the drawings, particularly Fig. 6, let it be assumed that the car of which the wheels 12 and axle 13 are a part, is traveling along the road either under power or coasting and that it is desired to effect an application of the brakes on the wheels 12. In such case, the operator first cuts off the propulsion power, if the power is on, and then operates a suitable brake valve device, not shown, to establish a pressure in the control pipe 153 corresponding to the desired degree of application of the brakes.

Assuming that the car wheels 12 continue to rotate at a speed corresponding to car or rail speed, and that the contact fingers 81, 82 and 83 of the switch device 72 of the rotary inertia device 11 remain separated, both the high and the low magnet valves 159 and 158 of the control valve mechanism 154 remain deenergized, and accordingly fluid under pressure is supplied from the control pipe 153 to the chambers associated with both the larger and the smaller diaphragms of the control valve mechanism. Since the larger diaphragm is active whenever fluid under pressure is supplied to its associated chamber, the pressure established by the control valve mechanism in the brake cylinder 151 corresponds substantially to the pressure established in the control pipe 153. Whenever the pressure in the control pipe 153 exceeds the uniform low pressure of five pounds per square inch, the switch member 165 of the pressure switch 155 is operated into contact with its associated contact fingers 168, but such operation is without effect as long as the contact fingers 81, 82 and 83 of the rotary inertia device 11 remain disengaged from each other.

The operator may vary the pressure in the control pipe 153 as desired to correspondingly vary the pressure in the brake cylinder 151 and thus produce any desired degree of application of the brakes.

Let it now be assumed, however, that upon an application of the brakes effected in the manner just described, the car wheels 12 begin to slip. In such case, the rate of rotative deceleration of the shaft 44 of the rotary inertia device 11 exceeds the rate at which the fly-wheel 43 of the inertia device 11 may remain in its normal position with respect to the shaft and accordingly the fly-wheel 43 shifts rotatively ahead of the shaft 44 and the disc 52 is correspondingly shifted slidably along the shaft to effect engagement of the contact fingers 81, 82 and 83 of the switch device 72.

The engagement of the contact finger 81 with the contact finger 82 completes a circuit for energizing the high magnet valve 159 of the control valve mechanism 154, this circuit extending from one terminal of the battery 156, hereinafter referred to as the positive terminal, through a wire 191, contact members 168 and switch member 165 of the pressure switch 155, wires 192 and 193, bracket 84 and contact finger 81, contact finger 82 and its bracket 84, a wire 194, the magnet winding of the high magnet valve device 159, and back to the negative terminal of the battery 156 as through a ground connection in the manner indicated.

Upon the energization of the magnet winding of the high magnet valve 159, the switch member 161 is actuated into contact with its associated contact members 162 to establish a self-holding circuit for maintaining the magnet winding of the high valve 169 energized independently of the engagement of contact finger 81 with the contact finger 82, this self-holding circuit extending from the positive terminal of the battery 156 through the pressure switch 155 to the wire 193 as previously traced, thence through the contact members 162 and switch member 161 of the high magnet valve 159, wires 195 and 194, magnet winding of the high magnet valve 159, and thence to the negative terminal of the battery 156 as through the ground connection indicated. Thus, once the magnet winding of the high magnet valve 159 is energized in response to the engagement of the contact fingers 81 and 82 of the rotary inertia device 11, it is thereafter maintained energized independently of the rotary inertia device as long as the switch member 165 of the pressure switch 155 remains in circuit-closing engagement with its contact members 168, which is for all practical purposes as long as the application of the brakes is continued, since the pressure switch 155 does not open until the pressure in the control pipe 153 is substantially reduced to atmospheric pressure and the brakes substantially released.

Upon the engagement of the contact finger 82 of the rotary inertia device 11 with the contact finger 83, a circuit is completed for energizing the magnet winding of the low magnet valve device 158 of the control valve mechanism 154, this circuit extending from the positive terminal of the battery 156 through the pressure switch 155 to the contact finger 81 of the rotary inertia device 11 as previously traced, thence through the contact finger 82 to contact finger 83, and then by way of a wire 196 connected to the bracket 84 associated with the contact finger 83, the magnet winding of the low magnet valve 158, and to the negative terminal of the battery 156 as through a ground connection in the manner indicated.

With both the high and the low magnet valves 159 and 158 accordingly energized, while the control pipe 153 is charged with fluid under pressure, the fluid under pressure is vented from the chambers associated with both the larger and the smaller diaphragms of the control valve mechanism 154 without any reduction of the pressure in the control pipe 153, and accordingly the control valve mechanism 154 operates to rapidly vent fluid under pressure to atmosphere from the brake cylinder 151.

The above operation takes place practically instantaneously upon the slipping of the car wheels 12 and accordingly the degree of application of the brakes on the car wheels is instantly and rapidly reduced whenever the car wheels begin to slip.

The magnet winding 173 of the magnet valve device 157 is connected in parallel with the magnet winding of the low magnet valve 158 and is accordingly simultaneously energized therewith to cause fluid under pressure to be supplied from the control pipe 153 to the piston chamber 134 of the operating cylinder 128 associated with the rotary inertia device 11.

As long as the car wheels 12 continue to rotate at a speed corresponding to the speed of the car, the magnet valve 157 remains deenergized and fluid under pressure is vented from the piston chamber 134 of the operating cylinder 128 associated with the rotary inertia device 11, so that the spring 136 of the operating cylinder 128 is effective to urge the plunger 123 inwardly to compressively tension the spring 116 of the clutch device 107 in the pulley 24, a maximum degree. Both of the coil springs 115 and 116 are thus effective to maintain the pulley 24 in driving relation to the shaft 44.

Upon the slipping of the car wheels 12 and the consequent supply of fluid under pressure to the piston chamber 134 of the operating cylinder 128 in response to the energization of the magnet valve device 157, the force exerted by the spring 136 tending to urge the plunger 123 and the rotary inertia device 11 inwardly is removed, and consequently the spring 116 of the clutch device 107 expands to its maximum degree and thus relaxes the force frictionally connecting the pulley 24 to the shaft 44.

Since the pulley 24 is always driven according to the speed of rotation of the car wheels 12, the clutch device 107 slips and thus enables the fly-wheel 43 to continue its rotation and to rotate the shaft 44 therewith after attaining the limited forward displacement thereof rotatively relative to the shaft 44 to maintain the contact fingers 81, 82 and 83 in constant engagement with each other. It will be observed that the spring 115 of the clutch device 107 remains effective at all times and, accordingly, the rapid rate of rotative deceleration of the pulley 24 does exert a slight dragging effect tending to slow down the shaft 44 and, in turn, the fly-wheel 43, but only sufficiently to maintain the rotative displacement between the fly-wheel and the shaft 44 and without causing the shaft and fly-wheel to decelerate rotatively below a speed corresponding to the car speed or rail speed.

As previously stated, the immediate and rapid reduction in brake cylinder pressure and the corresponding reduction in the degree of application of the brakes on the slipping car wheels 12 causes the car wheels to cease deceleration and begin to accelerate back toward a speed corresponding to car or rail speed without actually reaching the locked or non-rotative state. As long as the car wheels 12 continue to rotate at a speed less than that corresponding to the speed of the car whether decelerating or accelerating, the frictional connection between the pulley 24 and the shaft 44 through the clutch device 107 continues to slip although at the same time exerting sufficient drag on shaft 44 to cause the contact fingers 81, 82 and 83 of the rotary inertia device 11 to remain in contact with each other. It will, accordingly, be seen that the magnet valves 158 and 159 of the control valve mechanism 154 remain correspondingly energized to continue the venting of fluid under pressure from the brake cylinder and the consequent reduction in the degree of application of the brakes on the slipping wheels.

When the car wheels 12 have returned substantially back to a speed corresponding to the speed of the car and at which the shaft 44 and flywheel 43 are rotating substantially, the dragging effect of the pulley 24 on the shaft 44 is recoved and consequently the force tending to displace the fly-wheel forwardly with respect to the shaft 44 is removed and the spring 67 becomes effective to return the disc 52 backwardly to its normal position and at the same time to return the flywheel 43 to its normal position with respect to the shaft 44. The force urging the switch operating plunger 71 outwardly is accordingly removed and the springs 87 associated with the contact fingers 81, 82 and 83 accordingly restore the contact fingers to their respective normal separated positions. Upon the separation of the contact finger 82 from the contact finger 83, the circuit for energizing the magnet winding 173 of the magnet valve device 157 and the magnet winding of the low magnet valve 158, previously traced, is interrupted and accordingly the magnet windings of the magnet valve devices 157 and 158 are both deenergized.

The deenergization of the magnet winding 173 of the magnet valve 157 results in restoration of the magnet valve to its normal position shown in Fig. 6, wherein fluid under pressure is vented from the piston chamber 134 of the operating cylinder 128 associated with the rotary inertia device 7. The coil spring 136 of the operating cylinder 128 accordingly becomes effective to again urge the plunger 123 of the rotary inertia device 11 inwardly to compress the spring 116 and restore the maximum force urging the clutch member 110 into frictional engagement with the pulley 24.

At the same time, the deenergization of the winding of the low magnet valve 158 reestablishes communication through which fluid under pressure is supplied from the control pipe 153 to the chamber associated with the smaller of the diaphragms of the control valve mechanism 154 so that the resupply of fluid under pressure to the brake cylinder 151 and the reapplication of the brakes on the car wheels 12 is initiated.

The separation of the contact finger 81 of the rotary inertia device 11 from the contact finger 82 is without effect for, as previously stated, the switch member 161 of the high magnet valve 159 establishes a self-holding circuit for maintaining the magnet winding of the high magnet valve 159 energized independently of separation of the contact fingers 81 and 82. Accordingly, since the high magnet valve 159 remains energized, fluid under pressure is not resupplied from the control pipe 153 to the chamber associated with the larger diaphragm of the control valve mechanism 154. It will thus be seen that the maximum pressure restored in the brake cylinder 151 following the relief of the wheel-slipping condition will be only that fraction of the pressure established in the control pipe 153 determined by the area of the smaller diaphragm of the control valve mechanism 154, which is assumed to be three-fourths of the pressure established in the control pipe.

Although not shown, it should be understood that the self-lapping brake valve that controls the fluid pressure established in the control pipe 153 operates automatically without any act of the operator to maintain a pressure in the control pipe 153 corresponding to the operative position of the operating handle of the self-lapping brake valve device. Thus, a given pressure is always maintained during an application of the brakes in the control pipe 153 corresponding to the operating position of the self-lapping brake valve device regardless of the supply of fluid under pressure from the control pipe 153 to the chamber associated with the diaphragms of the control valve mechanism 154 following relief of the wheel-slipping condition.

It will thus be seen that, independently of any act of the operator, the maximum pressure restorable in the brake cylinder and consequently the maximum degree of application of the brakes restorable on the car wheels 12 following the slipping thereof is a fraction of the initial pressure or degree of brake application which initiated the slipping and, consequently, the likelihood of recurrence of slipping of the wheels is exceedingly negligible.

If, however, due to the reapplication of the brakes on the car wheels 12, the car wheels should again begin to slip, the release of the brakes and the reapplication of the brakes is repeated in the manner similar to that previously described except that the same degree of pressure is ultimately reestablished in the brake cylinder 151 upon reapplication of the brakes following the slipping.

After the car or train has been brought to a stop and it is desired to release the brakes prior to again starting the car or train, the operator merely reduces the pressure in the control pipe 153 to atmospheric pressure under the control of the self-lapping brake valve, not shown, fluid under pressure being vented from the chamber associated with the smaller diaphragm of the control valve mechanism 154 and the control valve mechanism 154 being correspondingly operated to vent fluid under pressure from the brake cylinder 151 to effect complete release of the brakes. When the pressure in the control pipe 153 reduces below the low pressure of five pounds per square inch, the pressure switch 155 opens and thus interrupts the holding circuit through the switch member 161 for the high magnet valve 159 and thus effects deenergization of the magnet winding of the high magnet valve 159 and restores the control valve mechanism 154 to its normal condition.

*Summary*

Summarizing, it will be seen that I have disclosed a vehicle brake system including a new and improved rotary inertia device for so automatically controlling the brakes on individual wheel-and-axle units or groups thereof as to instantly release the brakes when a wheel-and-axle unit begins to slip, and to prevent reapplication of the brakes on the slipping wheel-and-axle units until the slipping wheels return fully to a speed corresponding to vehicle or rail speed, and further including mechanism for limiting the reapplication of the brakes on the slipping wheels to a degree which is a fraction, such as three-fourths, of the degree which initiated the slipping, thereby rendering unlikely the possibility of recurrence of slipping.

The rotary inertia device of my present invention is generally similar to that disclosed in my Patent 2,140,620, and comprises an improved clutch arrangement between the driving pulley of the rotary inertia device and the rotary operating shaft of the inertia device including two coil springs, both of which are normally effective to a maximum degree to effect frictional engagement between the pulley and the shaft, and in further providing means automatically effective at the instant a car wheel begins to slip for relaxing the tension of one of the coil springs of the clutch device to insure the operation of the rotary inertia device in a manner that reapplication of the brakes on the slipping wheels cannot be effected before the slipping wheels return fully to the speed corresponding to vehicle or rail speed. The improved clutch device of the rotary inertia device constituting my present invention obviates the need for critical and delicate adjustment of a single coil spring in a clutch device as in the rotary inertia device of my Patent 2,140,620.

While I have shown my invention in connection with a single wheel-and-axle unit, it should be understood that in the application of the invention to a train brake system, duplicate equipment similar to that described is provided for each wheel-and-axle unit or different groups of wheel and axle units, whereby protection against sliding of individual wheel-and-axle units or groups thereof is provided independently of and aside from the general control of the brakes on all the wheel and axle units under the control of the operator.

It will be seen, therefore, that while I have disclosed a specific embodiment of my invention, various omissions, additions or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. A rotary inertia device comprising a rotary shaft, a rotary inertia element, means providing a resilient driving connection between said shaft and inertia element permitting rotary movement of the inertia element relative to the said shaft only when the rate of change in rotative speed of said shaft exceeds a certain rate, switch means operated in response to relative rotative movement between said shaft and said inertia element, a rotary member, a clutch device conditionable at one time so as to maintain a fixed rotative driving relation of the rotary member to the said shaft and conditionable at another time so as to permit relative rotary movement between the said rotary member and shaft, and additional means under the control of said switch means for varying the condition of said clutch device.

2. A rotary inertia device comprising a rotary shaft, a rotary inertia element, means providing a resilient driving connection between said shaft and inertia element permitting rotary movement of the inertia element relative to the said shaft only when the rate of change in rotative speed of said shaft exceeds a certain rate, control means operated in response to the relative rotative movement between said shaft and said inertia element, a rotary member, a clutch device conditionable at one time so as to maintain a fixed rotative driving relation of the rotary member to the said shaft and conditionable at another time so as to permit relative rotary movement between the said rotary member and shaft, and fluid pressure responsive means controlled by the control means for varying the condition of said clutch device.

3. In combination, a rotary shaft, a rotary element, a clutch device for effecting a driving connection between the said rotary element and the said rotary shaft, said clutch device including two separate resilient biasing means for urging the rotary element into driving relation to the said rotary shaft, one of said resilient means being variable in tension so as to vary the effective force urging the rotary element into driving relation with the rotary shaft whereby to permit relative rotary movement between the rotary element and the rotary shaft only when the rate of change in rotative speed of the rotary element exceeds a certain rate while the said one resilient means is tensioned to one degree, and to permit relative rotary movement between the rotary element and the rotary shaft when the rate of change in rotative speed of the shaft exceeds a second certain rate less than the first said certain rate while the said one resilient means is tensioned to a different degree, and means adapted to be rendered effective in response to a change of rotative speed of said rotary shaft at a rate exceeding the first said certain rate for varying the effective force of said one resilient means.

4. In combination, two rotary members, and a clutch device for associating said rotary members so that one rotary member drives the other, said clutch device comprising a clutch member rotatable at all times with one of said rotary members and shiftable axially with respect thereto into frictional relation with the said other rotary member, a plurality of resilient means for biasing said clutch member into frictional relation with the said other rotary member, and fluid pressure controlled means for varying the biasing force of only one of said resilient means.

5. A rotary inertia device of the type adapted to register variations in the rotative condition of a vehicle wheel, comprising a rotary shaft, a rotary inertia element, means providing a resilient connection normally maintaining said inertia element in a fixed rotative position with respect to the shaft and adapted to yieldingly permit shifting of the inertia element rotatively relative to the shaft out of its normal position when the rate of change in rotative speed of the said shaft exceeds a certain rate, control means operated in response to the shifting of the inertia element relative to the said shaft, a clutch device for establishing a driving connection through which the said shaft is rotated according to the rotation of a vehicle wheel, said clutch device being effective normally to maintain the driving connection between the shaft and the vehicle wheel with a certain degree of force, and means controlled by the said control means for varying the force with which the clutch device effects the said driving connection between the shaft and the vehicle wheel.

6. A rotary inertia device of the type adapted to register the rotative condition of a vehicle wheel, comprising a rotary shaft, a rotary inertia element, means providing a resilient connection between the shaft and the inertia element through which the shaft drives the inertia element, said connecting means being effective normally to maintain the inertia element in a certain fixed rotative position with respect to the shaft and adapted to yieldingly permit relative rotative movement of the inertia element with respect to the shaft when the rate of change in speed of the shaft exceeds a certain rate, control means normally in an inoperative position when the said inertia element and the shaft are in their normal relative positions and actuated to an operative position when the inertia element shifts rotatively relative to the shaft out of its fixed normal position relative to the shaft, a clutch device for effecting a driving connection between the said shaft and a vehicle wheel, said clutch device being adapted to exert one degree of retarding force on the shaft when the vehicle wheel decelerates at a rate in excess of a certain rate sufficient to actuate said control means to its operative position, and means for causing said clutch device to exert a lesser retarding force on the said shaft after the said control means is actuated to its operative position, said lesser retarding force being sufficient to maintain the inertia element in displaced relation out of its normal rotative position with respect to the shaft whereby the said control means is maintained in its operative position as long as the rotative speed of the vehicle wheel is less than the speed of rotation of said shaft.

7. A vehicle wheel brake system including a rotary inertia device, said rotary inertia device comprising a rotary shaft, a rotary inertia element, means providing a resilient yielding driving connection between the shaft and the inertia element adapted to maintain said inertia element in a fixed normal rotative position with respect to the shaft as long as the rate of change in rotative speed of the said shaft does not exceed a certain rate and adapted to permit relative rotative movement of the inertia element with respect to the shaft when the rate of change in rotative speed of the shaft exceeds said certain rate, a rotatable member rotated according to the speed of rotation of a vehicle wheel, a clutch device constructed and arranged to effect a frictional driving connection between the said rotatable member and the said shaft and to exert a retarding force on the said shaft, when a vehicle wheel slips, sufficient to cause the inertia element to shift rotatively out of its normal position, control means operated in response to the shifting of the inertia element rotatively out of its normal position with respect to the said shaft for effecting the release of the brakes on the vehicle wheel, and means controlled by said control means for reducing the retarding force exerted by the clutch device on the said shaft whereby to permit the said shaft and inertia element to decelerate at a lesser rate than the rate of deceleration of the said rotatable member while maintaining a sufficient retarding force on the said shaft to maintain the inertia element in its displaced relation with respect to the shaft and cause said control means to remain in its operated position to cause reduction in the degree of application of the brakes on the vehicle wheel as long as the vehicle wheels and accordingly the said rotatable member rotate at a speed less than the speed of the shaft.

8. In combination, a rotary inertia device of the type adapted to register the rotative condition of a rotary member, comprising a rotary shaft, a rotatable element driven according to the speed of rotation of the rotary member, a clutch device for effecting a driving connection between the rotatable element and the said shaft, said clutch device having a plurality of resilient biasing means for exerting a force urging the shaft and the rotatable element into frictional relation, means including a sleeve slidable on said shaft to different positions to compress or expand one of said resilient means whereby to vary the biasing force thereof, and a plunger slidable within said shaft for effecting slidable movement of said sleeve along said shaft.

9. In combination, a rotary inertia device of the type adapted to register the rotative condition of a rotary member, comprising a rotary shaft, a rotatable element driven according to the speed of rotation of the rotary member, a clutch device for effecting a driving connection between the rotatable element and the said shaft, said clutch device having a plurality of resilient biasing means for exerting a force urging the shaft and the rotatable element into frictional relation, means including a sleeve slidable on said shaft to different positions to compress or expand one of said resilient means whereby to vary the biasing force thereof, a plunger slidable within said shaft for effecting slidable movement of said sleeve along said shaft, and means controlled by the rotary inertia device for operating said plunger.

10. A device comprising a rotary shaft, a rotary member, and a clutch device for associating said rotary member and rotary shaft, said clutch device having a clutch member constructed and arranged so as to be fixed for rotation with said shaft and shiftable axially with respect to said shaft into frictional relation with the said rotary member, a plurality of resilient biasing means for biasing the said clutch member into frictional relation with said rotary member, and means controlled in response to the change in rotative speed of said shaft at a rate in excess of a certain rate for varying the biasing force exerted by at least one and less than all of said resilient means on said clutch member.

11. In combination, a rotary driving element, a rotary driven element, a clutch device including a movable clutch member for associating the driving element with the driven element in a manner to effect rotation thereof, two separate resilient biasing means for urging the clutch member into a position associating the driving and the driven elements, a rotary inertia element, means providing a resilient connection between the said rotary driven element and the rotary inertia element adapted to permit the rotary inertia element to shift rotatively out of a normal position with respect to the said rotary driven element when the rotary driven element changes its rotative speed at a rate exceeding a certain rate, and means controlled in response to the rotative shifting of the inertia element out of its normal position with respect to said driven element for reducing the biasing force of one of said two resilient means.

12. In combination, a pair of rotary members, a clutch device for associating one of said rotary members in driving relation to the other, said clutch device comprising an annular clutch member fixed for rotation with said other rotary member and adapted to move axially with respect thereto into associative connecting relation to the said one rotary member, a plurality of coil springs disposed in concentric relation to one another in surrounding relation to the said other rotary member, means fixed with respect to said other rotary member for engaging one end of one of said coil springs to tension it to a given degree and cause it to exert a corresponding biasing force urging the clutch member into associated relation with the said one rotary member, and means slidable on the said other rotary member adapted to engage one end of another of said coil springs and shiftable to different positions to vary the tension thereof whereby to vary its effective biasing force urging the clutch member into associated relation with the said one rotary member.

13. In combination, a pair of rotary members, and a clutch device for associating one of said rotary members in driving relation to the other, said clutch device comprising an annular clutch member fixed for rotation with the other of said rotary members and movable axially with respect thereto into a position associating the one rotary member in driving relation to the other, a plurality of coil springs disposed in concentric relation to one another and in coaxial relation to the said other rotary member adapted to urge the said clutch member into its associative position, means fixed with respect to the said other rotary member for tensioning one of said coil springs to a given degree, means movable with respect to said other rotary member to vary the tension of another of said coil springs, and fluid pressure controlled means for moving said last means.

14. In combination, a pair of rotary members, and a clutch device for associating one of said rotary members in driving relation to the other, said clutch device comprising an annular clutch member arranged coaxially with respect to said other rotary member in a manner to always rotate with said other rotary member and movable axially with respect thereto into a position associating the one rotary member in driving relation to the said other rotary member, a plurality of resilient biasing means for yieldingly urging the said clutch member into its associating position, and fluid pressure controlled means adapted to vary the biasing force exerted by a certain number less than all of said resilient means.

15. In combination, a pair of rotary members, and a clutch device for associating one of said rotary members in driving relation to the other, said clutch device comprising an annular clutch member arranged coaxially with respect to said other rotary member in a manner to always rotate with said other rotary member and movable axially with respect thereto into a position associating the one rotary member in driving relation to the said other rotary member, a plurality of resilient biasing means for yieldingly urging the said clutch member into its associating position, means adapted to tension one of said resilient means at all times a given uniform amount, and means adapted to normally tension another of said resilient means a given uniform amount and arranged under abnormal conditions to relax the tension thereof a given uniform amount.

16. In combination, a rotary shaft, a rotary member, a clutch device having a clutch member fixed for rotation with said shaft and movable axially with respect thereto into a position associating the rotary member in driving relation to the said shaft, a plurality of resilient biasing means for urging the clutch member into said position, fluid pressure controlled means for varying the force exerted by a certain number less than all of said resilient means on said clutch member, and means responsive to the rate of change of rotative speed of the said shaft for controlling the fluid pressure controlled means.

CLYDE C. FARMER.